March 17, 1936. J. WHITE 2,034,276
FLUID PRESSURE BRAKE
Filed Oct. 6, 1934
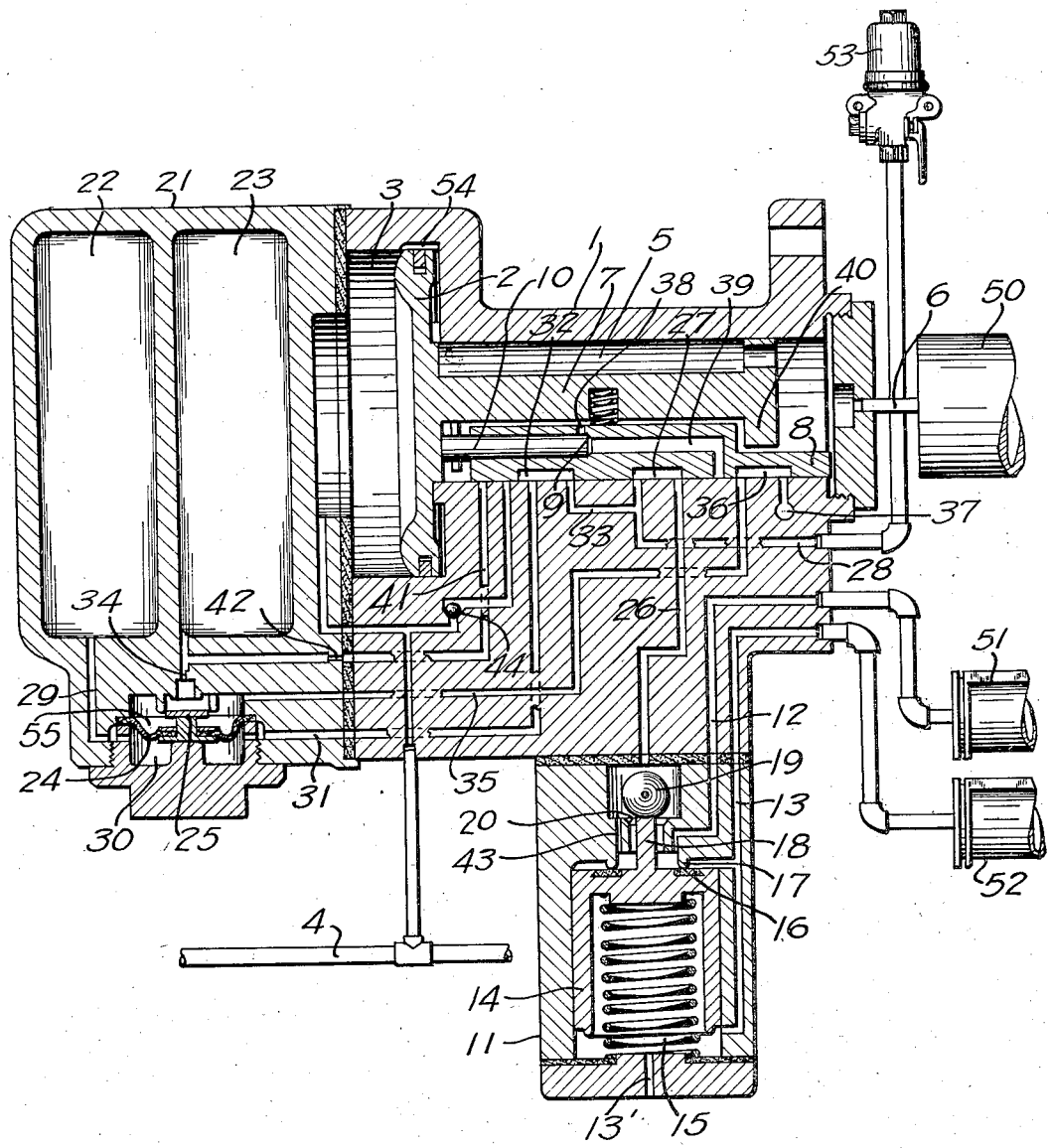
INVENTOR
JOSEPH WHITE.
BY Wm. M. Cady
ATTORNEY Patented Mar. 17, 1936

2,034,276

UNITED STATES PATENT OFFICE 2,034,276

FLUID PRESSURE BRAKE

Joseph White, Concord, near Sydney, New South Wales, Australia, assignor to The Westinghouse Air Brake Company, Wilmerding, Pa., a corporation of Pennsylvania Application October 6, 1934, Serial No. 747,187
In Australia December 8, 1933

10 Claims. (Cl. 303—39)

This invention relates to fluid pressure braking apparatus of the kind comprising a train pipe and a control or triple valve device adapted to control the supply of fluid to, and its release from, a brake cylinder or cylinders in accordance with variations in train pipe pressure and to vent fluid from the train pipe to a quick service or accelerating bulb upon effecting an application of the brakes in order to promote rapid serial application of the brakes throughout a train of vehicles.

In certain circumstances more particularly in connection with braking apparatus of this kind for freight trains, it is desirable that the rate of development of brake cylinder pressure should be retarded and, in order to counteract the increase in the stopping distance thus introduced, the capacity of the quick service or accelerating bulb may be increased.

If however an accelerating bulb device of the usual kind but of the larger capacity required were employed, excessive increments of brake cylinder pressure would be obtained when cycling the brakes on down gradients, that is to say, when alternately partially releasing and reapplying the brakes upon a train descending a gradient.

According to the present invention a quick service or accelerating bulb of the required capacity is employed but this bulb is divided into a number of chambers and the fluid pressure obtaining in one of these chambers is arranged to influence the exhaust of fluid from the other chamber or chambers so as to avoid excessive venting from the train pipe to the bulb when cycling the brakes and thus avoid excessive increments of brake cylinder pressure under cycling conditions.

In order that the invention may be readily understood it will now be described by way of example only, with reference to the accompanying drawing which illustrates in section a control or triple valve device embodying the invention.

Referring now to the drawing, the control or triple valve device comprises a casing 1 containing a piston 2 subject on one side in a piston chamber 3 to the fluid pressure obtaining in the train pipe 4 of the braking apparatus and on the other side in a slide valve chamber 5 to the fluid pressure obtaining in an auxiliary reservoir 50 which is arranged to be connected by a pipe 6 to the valve chamber 5. The piston 2 has a stem 7 adapted to cooperate with a slide valve 8 which has therein a seat 9 for an auxiliary valve 10 operatively connected to the piston stem 7.

Located at the lower part of the casing 1 is a minimum pressure or quick inshot valve device 11 which is adapted to control the rate of supply of fluid through a passage 12 to a light brake cylinder 51 and also to control the supply of fluid through a passage 13 to a load brake cylinder 52 of the braking apparatus. The quick inshot valve device 11 comprises a piston 14 normally held by a spring 15 in its upper position, as shown in the drawing, in which a seat 16 carried by the piston is applied to a seat ring 17, and a stem 18 of the piston holds a ball valve 19 raised from its seat 20.

Adjacent the piston chamber 3 of the triple valve device is located a quick service or accelerating bulb 21 which is divided into two chambers 22 and 23, the fluid pressure obtaining in the chamber 22 being arranged to act upon a diaphragm 24 which carries a valve element 25.

A retaining valve device 53 is connected to the usual brake cylinder release passage 28 in the triple valve device 1, and is of the usual type adapted to control the release of fluid under pressure from the brake cylinders 51 and 52 and having one position for permitting a complete release of fluid under pressure from said brake cylinders, and another position, employed in cycling operation, for permitting the release of fluid under pressure from the brake cylinders until the brake cylinder pressure is reduced to a predetermined low degree and then retaining said low degree of pressure bottled in said brake cylinders.

In operation, with the parts of the triple valve device 1 in the release condition, as shown in the drawing, fluid under pressure, supplied to train pipe 4, in the usual manner, flows to piston chamber 3 and from thence through a feed groove 54 to valve chamber 5 and from valve chamber 5 through pipe 6 to auxiliary reservoir 50, thereby charging said chamber and reservoir to brake pipe pressure. Under these conditions, the light brake cylinder 51 is vented to atmosphere through the passage 12, past the ball valve 19, through a passage 26, a recess 27 in the slide valve 8, passage 28, and through the retaining valve device 53 which, unless otherwise specified, will be considered to be in the normal or full venting position. The load brake cylinder 52 is vented to the atmosphere through the passage 13 and through a port 13'. The chamber 22 of the quick service bulb 21 is vented to atmosphere through a passage 29, a diaphragm chamber 30, a passage 31, a recess 32 in the slide valve 8, a passage 33, passage 28 and retaining valve device 53. The chamber 23 of the quick service bulb 21 is also vented to atmosphere through a restricted port 34, past the valve element 25 through a chamber 55, a passage 35, a recess 36 in the slide valve 8 and a passage 37.

When the train pipe pressure is reduced in order to effect an application of the brakes the piston 2 is moved to the left by the auxiliary reservoir pressure acting in the slide valve chamber 5 and in the first place moves the auxiliary valve 10 away from its seat 9 in the slide valve 8 thereby establishing communication through a port 38 between the slide valve chamber 5 and a passage 39 in the slide valve 8. Further movement of the piston to the left causes the slide valve 8 to be moved to the left owing to the abutment of the portion 40 of the stem 7 of the piston 3 against the slide valve. As the slide valve 8 is moved to the left hand or application position a recess 32 in said slide valve connects the train pipe 4 first through the passage 31 with the chamber 22 and then through a passage 41 having a restricted port 42 therein to the chamber 23. The train pipe is thus vented relatively rapidly into the chamber 22 and at a slower rate into the chamber 23, so that quick service braking action is transmitted serially throughout a train of vehicles, the venting to chamber 23 being restricted so as to tend to smooth out any surges in pressure which might be created in the train pipe due to the more rapid venting into chamber 22. In application position of the triple valve device communication between the chambers 22 and 23 and the atmosphere is cut off by the slide valve and fluid under pressure is supplied from the auxiliary reservoir through the valve chamber 5, port 38 and passage 39 in the slide valve 8, passage 26, past ball valve 19 and through passage 12 to the light brake cylinder 51. As soon as the pressure obtaining in the light brake cylinder 51 has attained a predetermined value, corresponding to the strength of the spring 15, the piston 14 is moved downwardly and allows the ball valve 19 to rest upon its seat 20 so that further flow of fluid to the light brake cylinder 51 takes place through a restricted port 43 only. In the lower position of the piston 14 the seat 16 is removed from the seat ring 17 so that fluid under pressure supplied from the auxiliary reservoir through the passage 26, and restricted port 43 also flows to passage 13 and from thence to the load brake cylinder 52.

In order to effect a release of brakes after an application, the train pipe 4 is charged with fluid under pressure in the usual manner. The consequent increase in train pipe pressure in piston chamber 3 moves the piston 2 and valves 8 and 10 towards the right hand to the normal or release position, as shown in the drawing, in which position the auxiliary reservoir 50 is charged with fluid under pressure from the train pipe 4 in the manner hereinbefore described.

In the release position of the triple valve device, the empty and load brake cylinders 51 and 52 are both vented to the atmosphere through passages 12 and 13, respectively, through port 43 and at the same time past the ball valve 19, and from thence through passage 26, recess 27, passage 28 and the pressure retaining valve device 53.

The quick service chamber 22 is connected through passage 29, chamber 30, passage 31, recess 32 and passage 33 to passage 28 through which fluid under pressure is vented from the brake cylinders 51 and 52, so that fluid under pressure is vented from said quick service chamber as fluid under pressure is released from the brake cylinders 51 and 52. When the triple valve device moves to release position, chamber 55 at the upper side of diaphragm 24 is vented to the atmosphere through passage 35, recess 36 in slide valve 8, and atmospheric passage 37, so that the pressure of fluid in the quick service chamber 22 and chamber 30 acts to deflect the diaphragm 24 and hold the valve element 25 seated until the pressure in chamber 30 is reduced sufficiently that the pressure of fluid in the quick service chamber 23 acting on the valve element 25 overcomes the pressure in chamber 30 and unseats said valve element, whereupon fluid under pressure is vented from the quick service chamber 23 through the restricted port 34 to chamber 55 and from thence to the atmosphere through passage 35, recess 36 and atmospheric passage 37.

When it is desired to cycle the brakes on a descending gradient, that is, when it is desired to partially release the brakes and then reapply the brakes alternately upon a train descending a gradient, the retaining valve device 53 is turned to the position for limiting the release of brakes while the brake system is being recharged with fluid under pressure preparatory to a subsequent application of the brakes.

In controlling the brakes on a descending gradient, the initial application of the brakes is effected in the same manner as hereinbefore described, both of the quick service chambers 22 and 23 being effective to reduce brake pipe pressure. In effecting a release of the brakes after an application, the brake cylinders 51 and 52, and the quick service chamber 22 are connected through the triple valve device to the retaining valve device 53 which operates to control the release of fluid under pressure therefrom, and when the pressure in said brake cylinders and chamber is reduced to the adjustment of the retaining valve device 53, said retaining valve device operates, in the usual manner, to cut off further venting of fluid therefrom. The pressure thereby bottled in the brake cylinders 51 and 52, quick service chamber 22 and diaphragm chamber 30 is sufficient to maintain the diaphragm 24 deflected upwardly to hold the valve element 25 seated, thereby preventing the venting of fluid under pressure from the quick service chamber 23.

When the brake system is sufficiently recharged with fluid under pressure during a release of brakes as just described, and it is desired to effect a further application, the brake pipe pressure is again reduced, and the triple valve device 1 again moves to its left hand or application position to supply more fluid to the brake cylinders 51 and 52.

When the triple valve device thus moves to application position, the brake pipe 4 is again connected through recess 32 to passage 31 leading to the quick service chamber 22 and to passage 41 leading to the quick service chamber 23. Fluid under pressure then flows from the brake pipe 4 to the quick service chamber 22 at a relatively fast rate and builds up therein on the pressure retained in said chamber by the operation of the retaining valve device 53 in effecting the previous release of brakes, but fluid under pressure is not vented from the brake pipe to the quick service chamber 23, since said chamber was retained charged by the valve element 25 in effecting the release of brakes immediately preceding the application. The degree of quick service reduction in brake pipe pressure in effecting an application of brakes subsequent to the initial application in cycling operation, is therefore limited to equalization into the quick service chamber 22 on top of the pressure retained in said chamber by the operation of the retaining valve device 53 during the release operation immediately preceding the further application of brakes.

The brakes may be partially released and reapplied alternately in the manner just described until a train reaches the foot of a gradient at which time it may be desired to effect a complete release of brakes.

In order to effect a complete release of brakes after cycling operation, the retaining valve device 53 is turned to its normal position to permit a complete release of fluid under pressure from the brake cylinders 51 and 52 and quick service chambers 22 and 23, and the pressure in the train pipe 4 is increased. The triple valve device 1 is thereby shifted to its normal position in which the auxiliary reservoir 50 is recharged with fluid under pressure, and in which the brake cylinders 51 and 52 and the quick service chamber 22 are connected to the retaining valve device 53 which acts to permit a complete release of fluid under pressure therefrom. When the pressure in chamber 30 acting on diaphragm 24 is thus reduced sufficiently, the pressure in the quick service chamber 23 acting on the valve element 25 unseats said valve element and reduces to atmospheric pressure through chamber 55, passage 35, recess 36 and passage 37.

From the above description of operation, it will be noted that normally the degree of quick service reduction in brake pipe pressure is controlled by chambers 22 and 23, the combined volumes of which may be greater than usual so as to provide a greater than usual normal quick service reduction in brake pipe pressure, but in cycling operation, the quick service chamber 23 is ineffective after the initial application of brakes, so that for all subsequent applications of brakes during the cycling period, the degree of quick service reduction is limited to the venting of fluid under pressure from brake pipe into the quick service chamber 22 only and on top of the pressure retained in chamber 22 by the retaining valve device 53 during a partial release of brakes immediately preceding the application.

Thus, where it is desirable that the rate of development of brake cylinder pressure should be retarded, a quick service or accelerating bulb device may be employed which is of more than the usual capacity so as to counteract the increase in the stopping distance which is a result of the slow rate of development of brake cylinder pressure, and excessive increments of brake cylinder pressure which would otherwise be obtained when cycling the brakes on down gradients are avoided by dividing the quick service or accelerating bulb into two chambers, the pressure in one of which influences the pressure obtaining in the other chamber.

It will be noted that the restricted port 42 provides for the relatively slow rate of quick service flow of fluid under pressure from the brake pipe to the quick service chamber 23. The check valve 44 is provided to prevent back flow from the chamber 23 to the brake pipe 4 when the triple valve device is in application position and when the pressure in the brake pipe is reduced to below that in the chamber 23.

The restricted port 34 is provided to restrict the release of fluid under pressure from the quick service chamber 23, so that even if the retaining valve device is in the position for effecting a full release of fluid under pressure from the brake cylinders 51 and 52 and quick service chamber 22, and an application of brakes is initiated before a full release of the brakes is obtained, the degree of quick service reduction in brake pipe pressure will be limited, by the pressure of fluid still remaining in the quick service chamber 23, to a degree less than normally attained when the chamber 23 is completely vented, and will thereby prevent obtaining an excessive, or greater than desired, increase in brake cylinder pressure under this condition.

It will be evident that the invention is not limited to the particular construction and arrangement of parts hereinbefore described which may be varied as desired to suit particular requirements without exceeding the scope of the invention.

Having now described my invention, what I claim as new and desire to secure by Letters Patent, is:

1. In a fluid pressure brake, the combination with a brake pipe and two quick service chambers, of a triple valve device movable upon a reduction in brake pipe pressure to an application position for effecting an application of the brakes and for venting fluid under pressure from said brake pipe to said quick service chambers for effecting a quick service reduction in brake pipe pressure, and movable upon an increase in brake pipe pressure to a release position for effecting a release of brakes and for establishing a communication through which fluid under pressure is vented from one of said chambers, a communication for venting fluid under pressure from the other of said quick service chambers independently of the venting of fluid under pressure from the first mentioned chamber, and valve means operative when the pressure in the first mentioned communication exceeds a predetermined degree for closing the second mentioned communication and operative when the pressure in the first mentioned communication is lower than said predetermined degree to permit opening of the second mentioned communication.

2. In a fluid pressure brake, the combination with a brake pipe, and two quick service chambers, of a triple valve device movable upon an increase in brake pipe pressure to a release position for effecting a release of brakes and for establishing separate communications through which fluid under pressure is adapted to be vented from said two quick service chambers, and movable upon a reduction in brake pipe pressure to an application position for effecting an application of the brakes and for establishing communications through which fluid under pressure is vented from said brake pipe to said quick service chambers for effecting a quick service reduction in brake pipe pressure, means governed by the pressure of fluid in one of said quick service chambers for controlling the venting of fluid from the other quick service chamber upon movement of said triple valve device to release position, and means for restricting the venting of fluid from the last mentioned quick service chamber.

3. In a fluid pressure brake, the combination with a brake pipe and two quick service chambers, of a triple valve device movable upon a reduction in brake pipe pressure to an application position for effecting an application of the brakes and for venting fluid under pressure from the brake pipe to both of said quick service chambers, and movable upon an increase in brake pipe pressure to a release position for effecting a release of brakes and for venting fluid under pressure from one of said quick service chambers, valve means controlled by the pressure of fluid in the last mentioned quick service chamber for controlling a vent communication to the other quick service chamber, and a restriction in said vent communication to limit the rate of venting of fluid under pressure from the quick service chamber connected to said vent communication.

4. In a fluid pressure brake, the combination with a brake pipe and two quick service chambers, of a triple valve device movable upon a reduction in brake pipe pressure to an application position for effecting an application of the brakes and for venting fluid under pressure from the brake pipe to one of said quick service chambers at a rapid rate through one communication and to the other quick service chamber at a slow rate through another communication, a restriction for defining said slow rate, a check valve in the last mentioned communication for preventing back flow through said restriction, said triple valve device being movable upon an increase in brake pipe pressure to a release position for effecting a release of the brakes and for venting fluid under pressure from said quick service chambers, and a restriction for limiting the rate of venting from the one quick service chamber to which the supply of fluid under pressure from the brake pipe is restricted by the first mentioned restriction.

5. In a fluid pressure brake, the combination with a brake pipe and two quick service chambers, of a triple valve device movable upon a reduction in brake pipe pressure to an application position for effecting an application of the brakes and for venting fluid under pressure from the brake pipe to one of said quick service chambers at a rapid rate and to the other quick service chamber at a slow rate, a restriction for defining said slow rate, a check valve for preventing back flow through said restriction, said triple valve device being movable upon an increase in brake pipe pressure to a release position for effecting a release of the brakes and for venting fluid under pressure from said quick service chambers, and valve means controlled by the pressure of fluid in one of said chambers for delaying the venting of fluid from the other of said chambers by the operation of said triple valve device.

6. In a fluid pressure brake, the combination with a brake pipe and two quick service chambers, of a triple valve device movable upon a reduction in brake pipe pressure to an application position for effecting an application of the brakes and for venting fluid under pressure from the brake pipe to one of said quick service chambers at a rapid rate and to the other quick service chamber at a slow rate, a restriction for defining said slow rate, a check valve for preventing back flow through said restriction, said triple valve device being movable upon an increase in brake pipe pressure to a release position for effecting a release of the brakes and for venting fluid under pressure from said quick service chambers, valve means controlled by the pressure of fluid in one of said chambers for delaying the venting of fluid from the other of said chambers upon the operation of triple valve device, and means for restricting the venting of fluid from the last mentioned chamber upon the operation of said valve means to open venting communication thereto.

7. In a fluid pressure brake, the combination with a brake pipe and two quick service chambers, of a triple valve device movable upon a reduction in brake pipe pressure to an application position for effecting an application of the brakes and for venting fluid under pressure from said brake pipe to said quick service chambers for effecting a quick service reduction in brake pipe pressure, and movable upon an increase in brake pipe pressure to a release position for effecting a release of the brakes and for establishing a release communication through which fluid under pressure is vented from one of said chambers, a valve for controlling a vent communication to the other of said chambers which is separate from said release communication, and a movable abutment, subject to the opposing pressures of said release communication and atmosphere, when said triple valve device is in release position for operating said valve to maintain said vent communication closed until the pressure of fluid in said release communication is reduced to below a chosen degree.

8. In a fluid pressure brake, the combination with a brake pipe and two quick service chambers, of a triple valve device movable upon a reduction in brake pipe pressure to an application position for effecting an application of the brakes and for venting fluid under pressure from said brake pipe to said quick service chambers for effecting a quick service reduction in brake pipe pressure, and movable upon an increase in brake pipe pressure to a release position for effecting a release of the brakes and for establishing a release communication through which fluid under pressure is vented from one of said chambers, a valve for controlling a vent communication to the other of said chambers, a restriction in said vent communication for providing a slow release of fluid under pressure from the last mentioned chamber, and a movable abutment, subject to the opposing pressures of said release communication and atmosphere, when said triple valve device is in release position, for operating said valve to maintain said vent communication closed until the pressure of fluid in said release communication is reduced to below a chosen degree.

9. In a fluid pressure brake, the combination with a brake pipe, a brake cylinder and two quick service chambers, of a triple valve device movable upon a reduction in brake pipe pressure to an application position for supplying fluid under pressure to said brake cylinder and for venting fluid under pressure from said brake pipe to said quick service chambers, and movable upon an increase in brake pipe pressure to a release position for releasing fluid under pressure from said brake cylinder and for establishing a communication from one of said quick service chambers to that through which fluid under pressure is released from said brake cylinder for releasing fluid under pressure from the last mentioned quick service chamber, and valve means for controlling a vent communication to the other quick service chamber which is independent of the brake cylinder release communication, said valve means being operated by the pressure of fluid in the first mentioned communication to maintain the vent communication closed until the pressure in the first mentioned communication is reduced to below a chosen degree.

10. In a fluid pressure brake, the combination with a brake pipe, a brake cylinder and two quick service chambers, of a triple valve device movable upon a reduction in brake pipe pressure to an application position for supplying fluid under pressure to said brake cylinder and for venting fluid under pressure from said brake pipe to said quick service chambers, and movable upon an increase in brake pipe pressure to a release position for releasing fluid under pressure from said brake cylinder and for establishing a communication from one of said quick service chambers to that through which fluid under pressure is released from said brake cylinder for releasing fluid under pressure from the last mentioned quick service chamber, a pressure retaining valve device for controlling the venting of fluid under pressure from said brake cylinder and the last mentioned quick service chamber and having a position for retaining a chosen pressure therein, and valve means for controlling a vent communication to the other quick service chamber which is separate from the brake cylinder release communication and operated by fluid at the pressure retained in said brake cylinder for maintaining said vent communication closed.

JOSEPH WHITE.